United States Patent [19]

Potter

[11] Patent Number: 4,912,661
[45] Date of Patent: Mar. 27, 1990

[54] TRACKING AND RESAMPLING METHOD AND APPARATUS FOR MONITORING THE PERFORMANCE OF ROTATING MACHINES

[75] Inventor: Ronald W. Potter, Mill Creek, Wash.

[73] Assignee: Hewlett-Packard Company, Palo Alto, Calif.

[21] Appl. No.: 127,356

[22] Filed: Dec. 1, 1987

[51] Int. Cl.⁴ .......................... G06F 15/46; G01H 1/00
[52] U.S. Cl. ...................................... 364/550; 73/660;
364/506; 364/508
[58] Field of Search ............... 364/178, 179, 506, 508,
364/550; 324/160; 73/862.34, 660; 340/681

[56] References Cited

U.S. PATENT DOCUMENTS

| | | | |
|---|---|---|---|
| 4,031,366 | 6/1977 | Hartung | 364/506 |
| 4,426,641 | 1/1984 | Kurihara et al. | 364/179 |
| 4,488,240 | 12/1984 | Kapadia et al. | 364/508 |
| 4,667,297 | 5/1987 | Kawai | 324/160 |

Primary Examiner—Parshotam S. Lall
Assistant Examiner—Kevin J. Teska

[57] ABSTRACT

A tracking and resampling method for monitoring the performance of a rotating machine (10) is disclosed. One or more measuring devices (13) provide rotating machine performance data to a signal processor (14) that samples the performance data at uniform time increments. A digitized waveform of the sampled performance data is interpolated by an interpolation filter. The sampled performance data is convolved with the impulse response of the interpolation filter to provide a continuous time function waveform depicting the rotating machine performance data. The signal processor (14) resamples the continuous time function waveform at uniform rotating shaft phase angle increments.

21 Claims, 11 Drawing Sheets

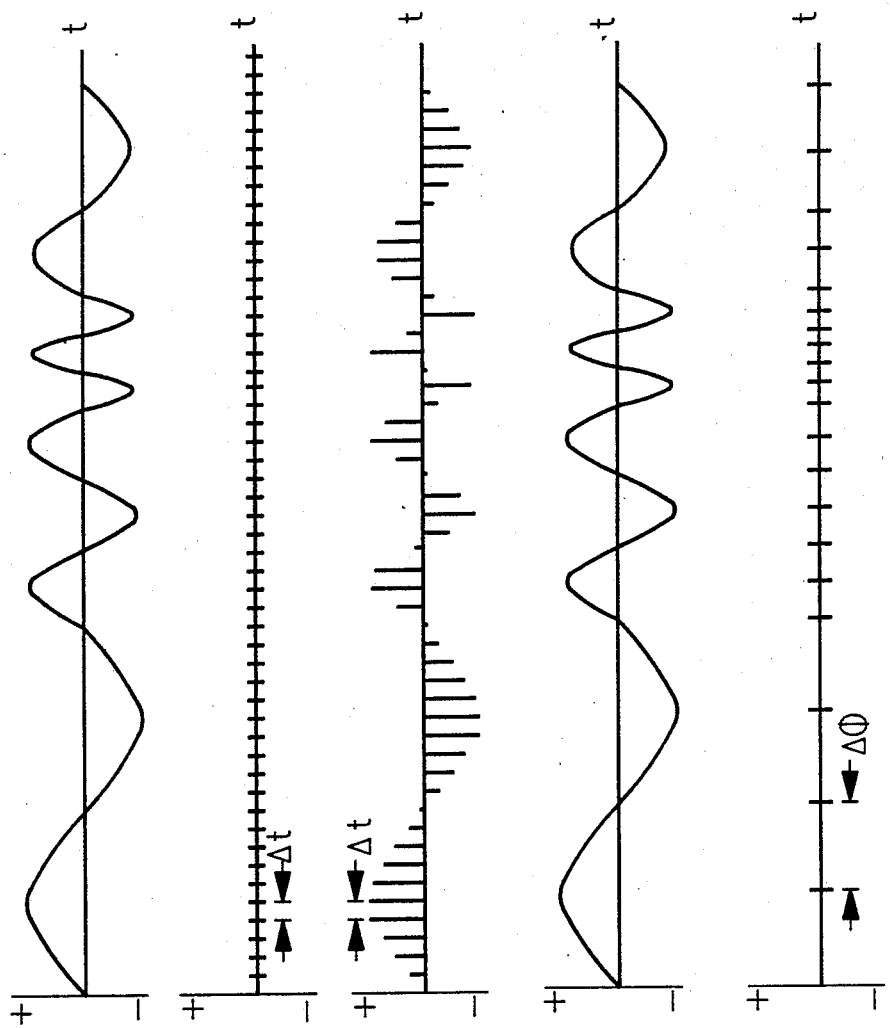

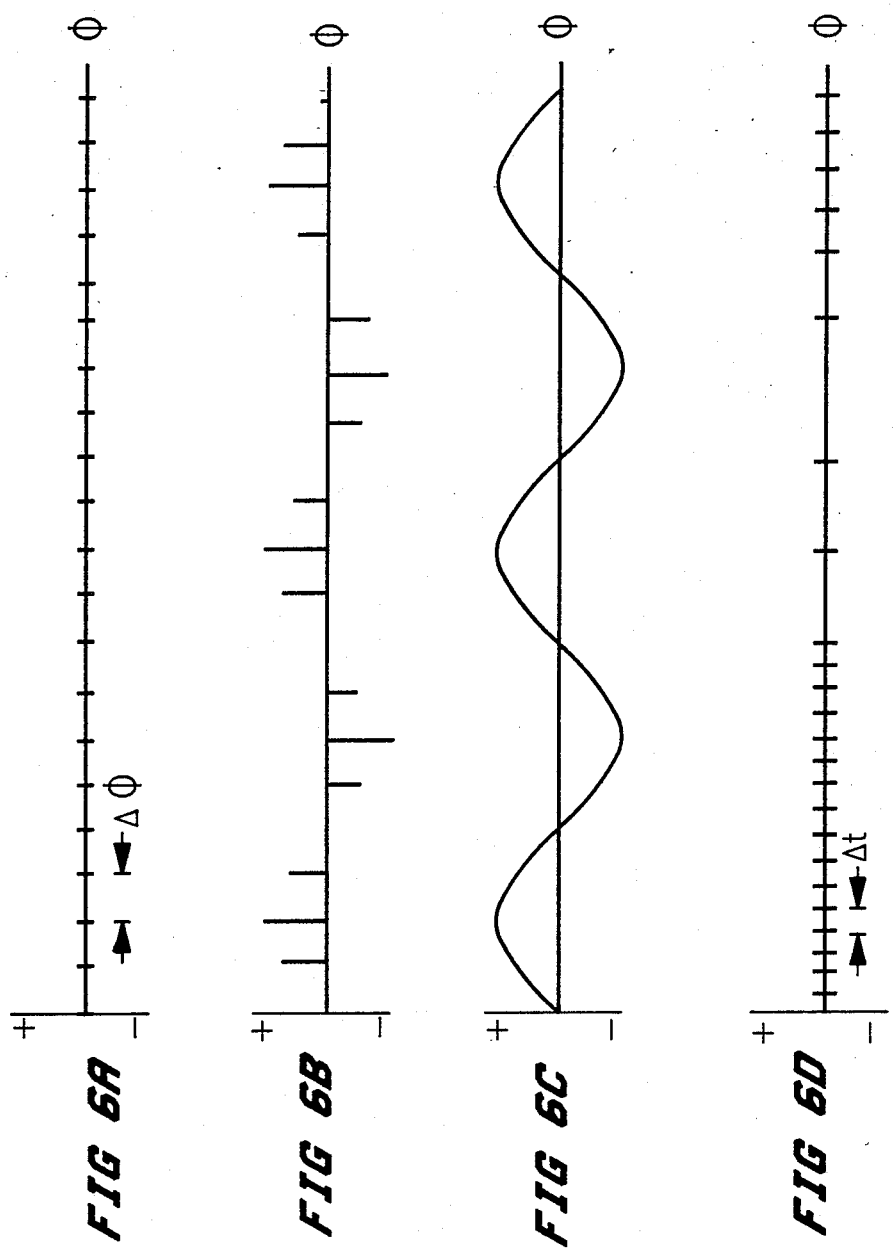

TRACKING AND RESAMPLING METHOD AND APPARATUS FOR MONITORING THE PERFORMANCE OF ROTATING MACHINES

TECHNICAL AREA

This invention relates to methods and apparatus for monitoring the performance of machines and, in particular, to methods and apparatus for monitoring the performance of rotating shaft machines.

BACKGROUND OF THE INVENTION

In order to better evaluate the performance of rotating machines, it has been found desirable to represent the performance characteristics of rotating machines in terms of shaft position, or shaft phase angle instead of in terms of uniform time intervals. Unfortunately, performance data for rotating machines is generally produced and sampled at uniform time intervals. In order to produce shaft position or phase angle based data, the uniform time interval data must be processed in a manner that converts the time based data to phase angle based data.

The classical approach used in the prior art to convert time based performance data to uniform shaft phase angle data utilizes numerous hardware components to accomplish the conversion. Such hardware may include: a sensor that monitors the rotation of a shaft; a counter that registers pulses produced when the shaft is rotated; one or more tracking analog filters that limit the aliasing errors associated with data sampling and, a tracking ratio synthesizer that generates sampling pulses synchronously with the rotation of the shaft, whose velocity is arbitrary with respect to time. Because the tracking analog antialiasing filters must communicate with the tracking ratio synthesizer and adjust for varying shaft velocity, they are complex and, therefore, expensive to design.

Tracking ratio synthesizers are undesirable because of their inherent time delay. More specifically, a tracking ratio synthesizer includes an oscillator that generates the synchronized sampling pulses and a feedback control loop, such as a phase lock loop circuit, to control the oscillator frequency. Because the feedback control loop responds to changes in shaft velocities after a change in shaft velocity is sensed by the control loop, a time delay occurs between changes in shaft velocity and the synchronized output of the tracking ratio synthesizer. As a result of this time delay, the monitoring hardware used by the prior art lags behind the actual machine condition and may be sampling data at a rate that does not agree with the current shaft velocity. When the oscillator frequency drifts away from the preselected sampling frequency the control loop will correct the error; however, during this correction period, errors are introduced into the system which contaminate and distort the input data being measured. Similarly, when the feedback control loop attempts to correct the oscillator frequency, it may overshoot the target frequency and cause additional system error, which may in turn cause a further time delay before the frequency is fully corrected.

This invention is directed to overcoming the foregoing disadvantages. More particularly, this invention provides a method and apparatus for monitoring the performance of rotating machines in terms of shaft position or phase angle that does not require numerous complex and expensive hardware components. The invention also eliminates the time delay associated with such hardware and reduces the error signals introduced into the system, thereby resulting in a more cost effective, more responsive and more accurate method for monitoring the performance of rotating machines.

SUMMARY OF THE INVENTION

In accordance with this invention, a tracking and resampling method for monitoring the performance of rotating machines based on shaft phase angle and an apparatus for carrying out the method are provided. One or more measuring devices produces rotating machine performance data that is filtered by one or more analog anti-aliasing filters to remove high frequency signals. The resulting rotating machine performance data is processed by analog-to-digital (A/D) converters and received by a signal processor. The signal processor samples the performance data at uniform time increments and produces a digitized waveform of the sampled performance data. The sampled performance data is interpolated by the signal processor to provide a continuous time function waveform approximating the actual rotating machine performance data. The signal processor then resamples the continuous time function waveform at times corresponding to uniform rotating shaft phase angle increments.

In further accordance with this invention, the resampling of the continuous time function waveform is initiated by a velocity trigger having a value that lies between first and second velocity limits. The velocity trigger limits are derived by: determining the coefficients of a polynomial equation that relates the shaft phase angle of the rotating machine to time by measuring the time at which two or more sequential synchronization pulses are produced by a sensor triggered at known (preferably uniformly) spaced shaft angles; and, substituting the constants and predetermined limiting phase angles into an equation that relates velocity to phase angle, without time as a factor. The equation is created by: differentiating the polynomial with respect to time; solving the differentiated equation for time; and, substituting the result into the polynomial equation for phase angle. The predetermined limiting phase angles are calculated on the basis of a given shaft phase angle sector that, preferably, equals the shaft phase angle sector associated with a pair of sequential shaft synchronization pulses and is centered at a phase angle associated with a middle synchronization pulse, although this restriction is not necessary. The velocity trigger value is derived by incrementing a velocity value by a given amount until the velocity value falls within the limits. The thusly derived velocity trigger is converted to its related phase angle using the previously derived equation relating velocity to phase angle, solved for phase angle. Thereafter, the interpolated continuous time function is resampled. Resampling times are determined by using the previously derived polynomial equation that relates phase angle to time, solved for time. While the first resampling time may be based on the phase angle corresponding to the velocity trigger, if desired, resampling may begin at times that do not correspond to the velocity trigger. Subsequent resampling times are based on incrementing the velocity trigger phase angle by a predetermined phase angle increment a given number of times based on the number of data points to be developed for the chosen shaft phase angle sector.

In accordance with further aspects of this invention, if, during resampling, the incremented velocity trigger phase angle reaches the upper limit phase angle before the velocity trigger phase angle has been incremented the given number of times, the velocity trigger phase angle is reset to a new value, preferably by decreasing the velocity trigger phase angle by the shaft phase angle sector associated with a pair of sequential shaft synchronization pulses. Thereafter, the system waits for another shaft phase angle synchronization pulse to occur. When the next sync pulse occurs, the above process is repeated up to the point where a velocity trigger value is to be determined. Rather than calculating a new velocity trigger, the program continues the resampling process beginning with the reset velocity trigger. Resampling continues until the remaining unsampled portion of the prior segment is resampled and its associated data block filled. Once the data block associated with the reset velocity trigger has been filled, a new velocity trigger value within the current velocity limits is looked for by: determining if the velocity is increasing or decresing and checking to see if an incremented trigger velocity value will lie below the new upper limit if the velocity is increasing or if a decremented trigger velocity value will lie above the new lower limit the velocity is decreasing. Since data samples lying between the current limits have not been generated, the appropriate check will be passed. As a result, a new velocity trigger will be generated and data samples lying between the current limits generated. If (or when) the given number of data samples lying between the current limits are generated, the system waits for the next shaft angle synchronization pulse. When the next shaft angle synchronization pulse occurs, the above process is repeated.

As will be readily appreciated from the foregoing description, the invention is ideally suited for monitoring the performance of rotating machines. The software utilized in the signal processor offers flexibility for parameter changes not readily available with the hardware in the prior art. Further, the invention provides a more accurate and more responsive method for monitoring the performance of rotating machines. Consequently, the invention overcomes the disadvantages of the prior art monitoring hardware while satisfying industrial and commercial needs.

BRIEF DESCRIPTION OF THE DRAWINGS

The foregoing and other features and advantages of this invention will become more readily appreciated as the same becomes better understood by reference to the following detailed description, and when taken in conjunction with the accompanying drawings, wherein:

FIGS. 5A, 5B, 5C, 5D and 5E are a series of time domain based wave-forms illustrating the shapes of signals at various stages as they are processed in accordance with the tracking and resampling method of the invention depicted in FIGS. 4A, 4B, 4C, 4D and 4E; and, FIGS. 6A, 6B, 6C and 6D are a series of phase angle based waveforms illustrating the shapes of signals at various stages as they are processed in accordance with the tracking and resampling method of the invention depicted in FIGS. 4A, 4B, 4C, 4D and 4E.

DESCRIPTION OF THE PREFERRED EMBODIMENT

As is well known to those skilled in the rotating machine art, in order to improve their design there is a need to monitor the performance of rotating machines. Monitoring the performance of a rotating machine and rapidly recording the performance data allows the tested rotating machine data to be compared to established design criteria. Alternatively, the test data can be used to establish parameters for use in designing other similar rotating machines. While those skilled in the rotating machine monitoring art sometimes prefer to analyze rotating machine performance data in terms of rotating shaft phase angle (i.e., shaft position) and, therefore, independent of time, rotating machine performance data, unfortunately, is normally produced as a function of time. As a result, monitored performance data must be converted from time domain form to phase angle form prior to being analyzed. More unfortunately, the relationship between phase angle and time is such that for a shaft having a varying rotational velocity, data sampled at uniform time increments correlates to data samples at nonuniform phase angle increments. The reverse relationship is also true, under similar conditions. Uniform phase angle increments, correlate to nonuniform time increments.

Figure 1:
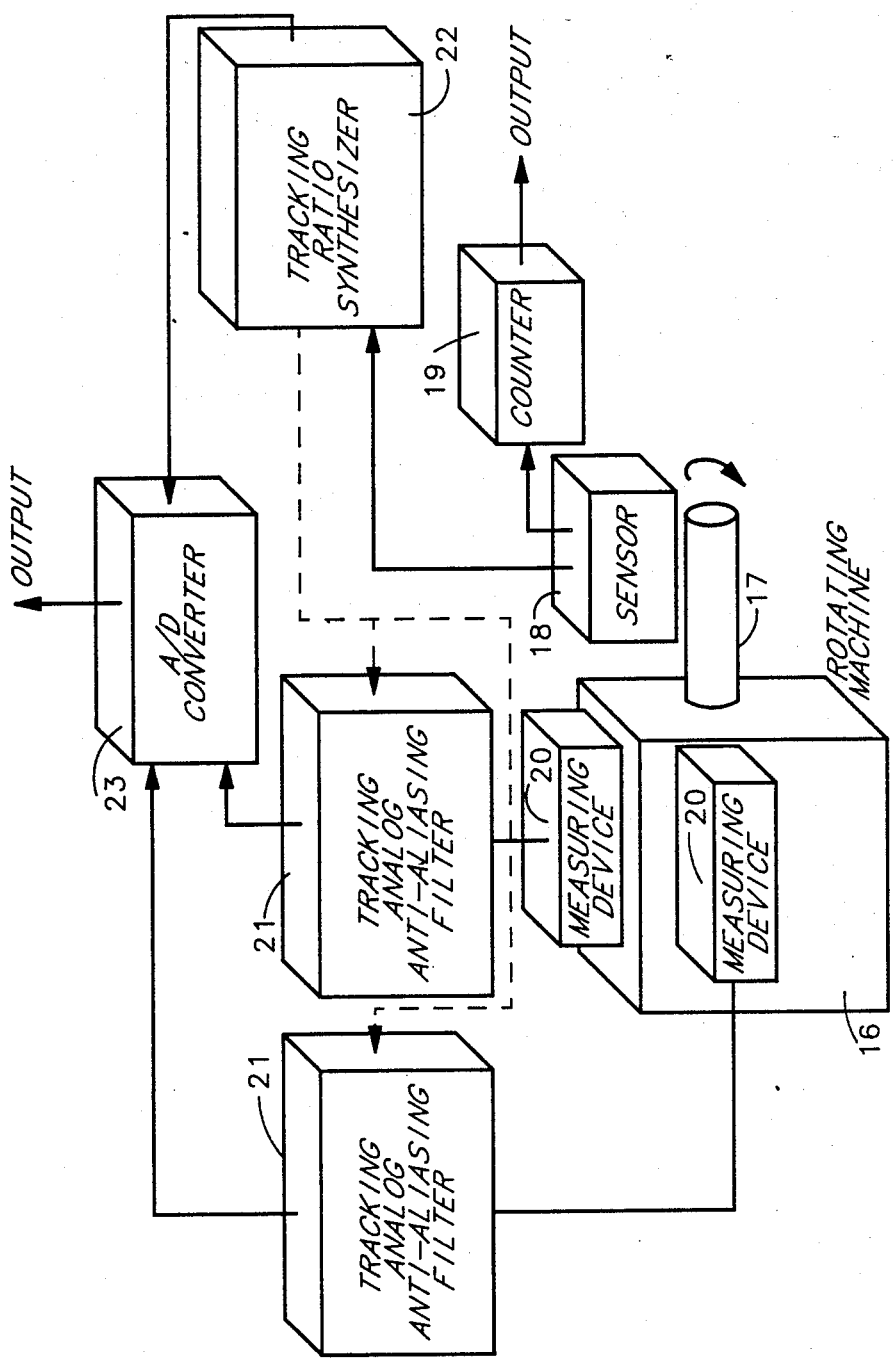
FIG. 1 is a simplified block diagram illustrating a prior apparatus for monitoring the performance of a rotating machine based on shaft phase angle.

The prior art, illustrated in FIG. 1, transforms rotating machine performance data from the time domain to the phase angle domain through the use of a multitude of hardware components and analog devices. More specifically, FIG. 1 illustrates that, in the past, the performance of a rotating machine 16, having a rotating shaft 17 has been measured by one or more measuring devices 20. As performance data is generated, a sensor 18 that monitors the rotation of the shaft 17 produces pulses at a rate related to shaft speed. A counter 19 connected to the sensor 18 provides shaft velocity data by counting the number of pulses produced by sensor 18 per unit of time. One or more tracking analog anti-aliasing filters 21 connected to the measuring devices 20 smooth the performance data produced by the measuring devices 20 by removing high frequency signals. A tracking ratio synthesizer 22 receives shaft velocity pulse data from the sensor 18 and produces a series of sampling pulses that are synchronized with the rotation of the shaft 17. The tracking ratio pulses are applied to an analog-to-digital (A/D) converter 23. The tracking ratio synthesizer 22 also supplies synchronizing data to the tracking analog anti-aliasing filters 21 to allow the tracking analog anti-aliasing filters 21 to adjust their filtering bandwidth to the sampling frequency generated by the tracking ratio synthesizer 22. The tracking analog anti-aliasing filter output data is applied to the A/D converter 23. The A/D converter 23 samples the performance data, which has been smoothed by the tracking analog anti-aliasing filters 21, at the synchronous rate established by the tracking ratio synthesizer 22.

The tracking ratio synthesizer 22 utilizes an oscillator to generate the synchronizing pulses and a feedback control loop, such as a phase lock loop circuit, to control the oscillator frequency. Because such feedback control loops respond to changes in shaft velocities after a change in shaft velocity is sensed by the control loop, a time delay between changes in shaft velocity and the synchronized output of the tracking ratio synthesizer 22 is created. As a result of this time delay, the monitoring hardware (FIG. 1) lags actual machine performance and may be sampling data at a rate that does not agree with the current shaft velocity. When the oscillator frequency drifts away from the preselected sampling frequency the control loop will correct the error; however, during this error period, additional errors are introduced into the system. Similarly, when the feedback control loop attempts to correct the oscillator frequency, it may overshoot the target frequency and cause additional errors, which may in turn cause a further time delay before the frequency is fully corrected. This time delay produces erroneous test data and necessitates a substantial amount of machine and operator time to allow the monitoring system to adjust to the actual rotating machine performance data.

Figure 2:
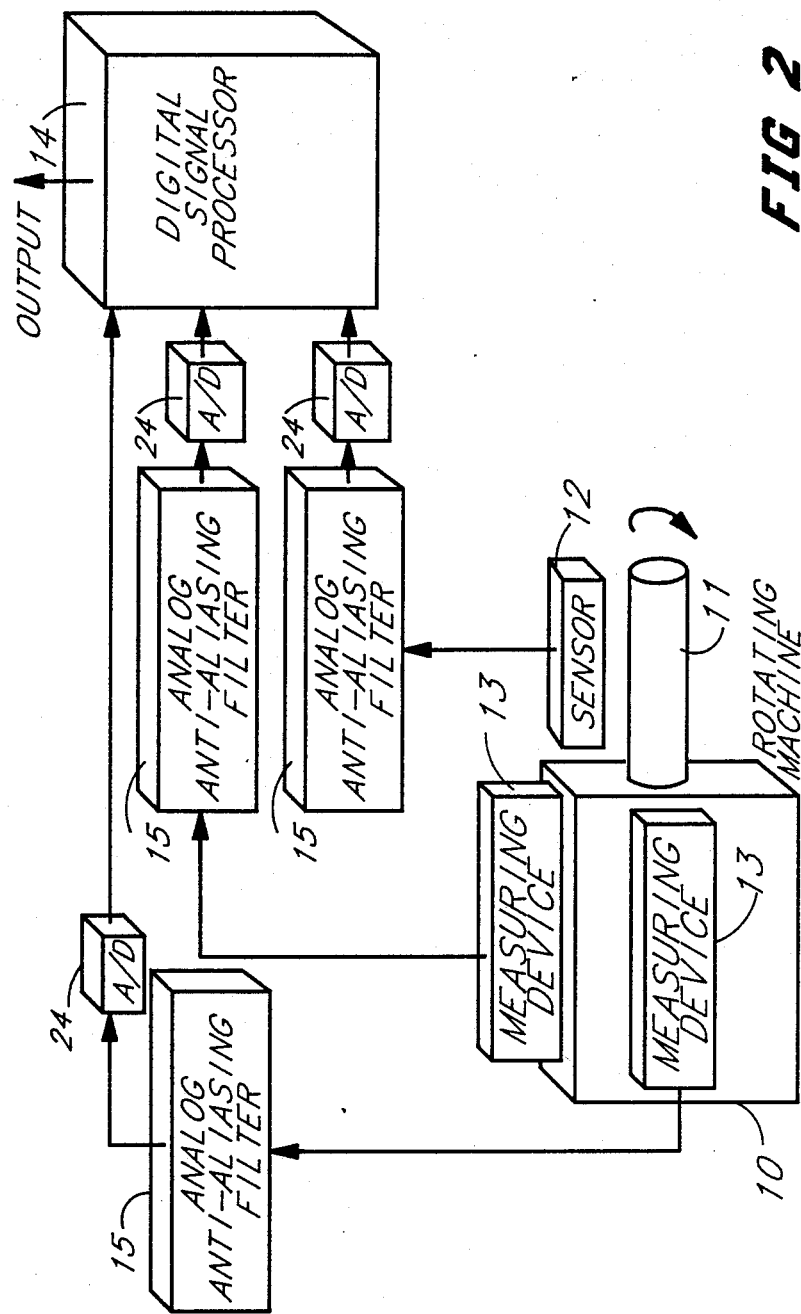
FIG. 2 is a simplified block diagram of an apparatus for monitoring the performance of a rotating machine based on phase angle formed in accordance with the invention.

The present invention is directed to a method for monitoring the performance characteristics of a rotating machine 10 while reducing the need for numerous complex and expensive hardware components and, thereby, reducing the time delay and error signal contributions associated with the hardware devices used by the prior art. As illustrated in FIG. 2, an apparatus formed in accordance with this invention comprises: a sensor 12 for sensing the rotation of a shaft 11 associated with a rotating machine 10; an analog anti-aliasing filter 15, connected to the sensor 12 for removing high frequency signals; one or more measuring devices 13 for measuring various characteristics of the rotating machine 10; one or more analog anti-aliasing filters 15, connected to the measuring devices 13, for removing high frequency signals; one or more A/D converters 24 for converting the output of the filters 15 from analog form to digital form; and, a signal processor 14. The signal processor 14 is preferably a digital signal processor controlled by software that functions in the manner illustrated in FIGS. 3 and 4A-E and described below. The analog anti-aliasing filters 15 used in this invention are less complex than those used in the prior art and therefor less expensive to design. Unlike the filters used in the prior art, the analog anti-aliasing filters 15 used by this invention do not need to be of the tracking type. Bandwidth adjustments for various sampling rates are made in the signal processor 14.

Figure 3:
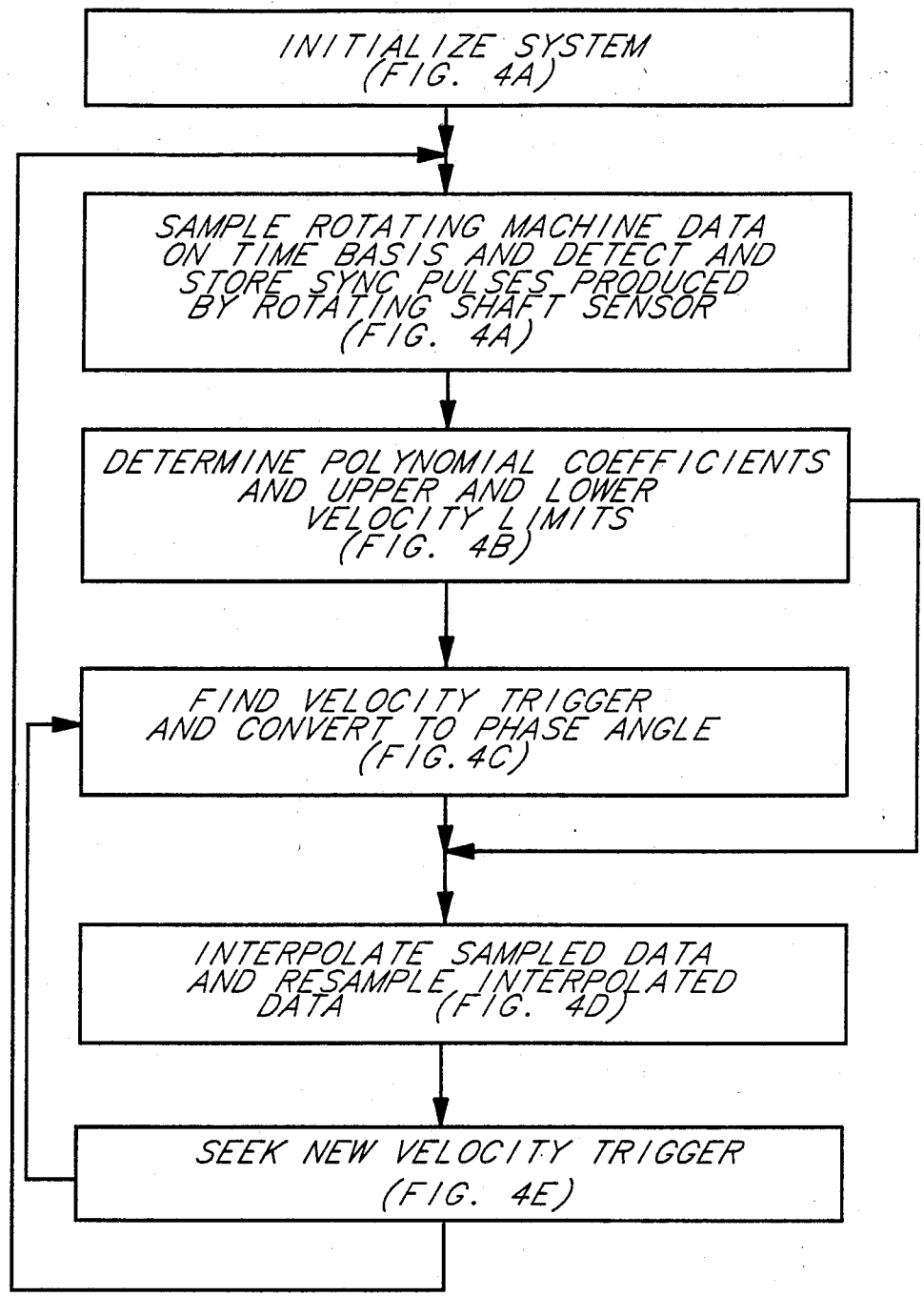
FIG. 3 is a system flow diagram illustrating a tracking and resampling method suitable for use in controlling the digital signal processor of the embodiment of the invention depicted in FIG. 2.

The tracking and resampling method of the invention for monitoring the performance of a rotating machine 10 is broadly set forth in the functional steps illustrated in FIG. 3. Each functional step is performed by a series of substeps, illustrated in FIGS. 4A-E and discussed in detail below. The first functional step illustrated in FIG. 3 is initializing the system by setting counters to prescribed values and reading and storing the values of selected variables used in carrying out the method of the invention. As will be better understood from the following description of FIG. 4A, the selected variables are either determined by the operator, or determined by the rotating machine 10 being tested and/or the sensor 12.

The next functional step is to sample and store the performance data of the rotating machine 10 on a time basis, while detecting and storing synchronization pulses produced by the sensor 12 as the shaft of the rotating machine 10 rotates. More specifically, the A/D converters 24 convert the analog signals produced by the analog anti-aliasing filters 15. The signal processor 14 samples the rotating machine performance data produced at the outputs of the A/D converters 24 at uniform time intervals. An internal clock, CLK, within the signal processor 14 establishes the sampling times. The result of the sampling are digitized waveform approximations of the actual rotating machine performance data. This data is stored in the signal processor 14 for later resampling. Simultaneously, the signal processor looks for the sync pulses produced by the sensor 12. The time of arrival of each sync pulse is measured and stored. Since the sync pulses are produced at known shaft phase angles, the time of arrival is related to shaft phase angle. Depending upon the environment of use, a pulse may be produced for each shaft rotation. In this instance, the times of arrival would be at shaft angles of 0°, 360°, 720°, etc. Alternatively, a multiple number of pulses may be produced for each shaft rotation. Regardless of the number of sync pulses produced per shaft revolution, after start-up, the method remains at the second step illustrated in FIG. 3 until some minimum number of sync pulses have been produced by the sensor 12 and their arrival times stored. In the herein described embodiment of the invention the chosen minimum number of sync pulses is three.

The next functional step, illustrated in the next block of FIG. 3, is to determine the coefficients of a polynomial equation relating shaft phase angle to time that corresponds to the rotating machine 10 under test and to determine the limits of a particular segment of the curve defined by the polynomial. The limits determine the range within which resampling will occur. More specifically, the phase angle, $\phi$, of a rotating shaft 11 can be related to time, t, by a quadratic polynomial equation of the form:

$$\phi = At^2 + Bt + C \tag{1}$$

where the coefficients A, B and C are unique to a particular polynomial segment of the rotating machine 10 under test. In accordance with this invention, the values of the coefficients are determined by creating three equations using the arrival times of three sequential sync pulses and their associated known shaft phase angles. The three equations are simultaneously solved in accordance with well-known mathematical principles to determine the values of the A, B and C coefficients. For example, matrix algebra or a modified version of matrix algebra known as substitution algebra can be used by the digital signal processor 14 to solve the three equations.

Additional sync pulse arrival times may be used to improve the accuracy of the rotating machine 10 data. When more sync pulses are used than are necessary, another well known process, namely, least squares estimation, may be used in conjunction with matrix algebra to solve for the polynomial coefficients. Likewise, higher order polynomial equations may also be used to improve the accuracy of the polynomial segment of the rotating machine 10 under test. In such instances, an iterative process can be used to solve the polynomial equation for time. Thus it is to be understood that the quadratic polynomial equation set forth above in Equation (1) is but an example of the many polynomial equations that may be used by an embodiment of the invention to determine the performance characteristics of a rotating machine 10.

Once the polynomial coefficients have been determined, the signal processor calculates upper and lower limits within which the resampling of data will occur. The limits are determined in terms of shaft velocity and, for a quadratic polynomial, are based on the assumption that shaft velocity varies linearly with respect to time. As described in detail below, the limits are determined by: differentiating Equation (1) with respect to time; rearranging the result to solve for time; substituting the result of the rearrangement into Equation (1); and, simplifying the result. The resulting equation relates phase angle to velocity without time as a factor. Velocity limits are determined by inserting upper and lower phase angle limits in the equation and solving the equation. The upper and lower phase angle limits are chosen to cover a sector of the curve defined by Equation (1), preferably lying between the phase angles associated with the first and last pulses. Preferably, the sector covers one half of the curve and is centered at the midpoint of the curve, however, this is not a necessary requirement.

After the polynomial coefficients and velocity limits have been determined, the program proceeds to the next functional step, which is to find a velocity trigger lying between the velocity limits. (As discussed below, the velocity trigger is used to initiate resampling.) The signal processor 14 determines the velocity trigger value by incrementing a starting velocity value and testing the result to determine if it lies between the velocity limits. When a suitable velocity trigger is found, the velocity trigger is converted from velocity form to phase form using the previously discussed equation that relates velocity to phase angle without time as a factor, rearranged to solve for phase angle.

The next functional step, illustrated in FIG. 3, is to interpolate the sampled performance data received and stored during the Equation (1) time period associated with the current values of A, B and C. The digitized performance waveform is interpolated in the signal processor 14. The interpolation process, in effect, smooths out the digitized waveform and produces a continuous time function waveform.

After the digitized waveform of the rotating machine performance data has been interpolated, the signal processor 14 resamples the interpolated data. The point in time where the resampling process is initiated is determined by a velocity trigger phase angle developed in the manner described above. More specifically, Equation (1), rearranged to solve for time, is used to determine the time associated with the velocity trigger phase angle, also referred to as a resample time, and the continuous time function waveform is sampled with respect to the calculated time. Thereafter, the velocity trigger phase angle is incremented by a preselected amount and the time associated with the incremented velocity trigger phase angle determines a new sampling time using Equation (1) rearranged to solve for time. This time is then used to determine another data sample. The process is repeated until either a preselected number of data samples (i.e., a data block) have been stored, or the incremented velocity trigger phase angle exceeds the phase angle associated with the upper velocity limit for that polynomial segment. The end result is a series of data samples spaced by uniform phase angle increments rather than by uniform time increments.

Once the resampling process is completed for a particular velocity trigger, the program shifts to the next functional step, which is to seek another velocity trigger. If the resampling process was terminated as a result of the incremented trigger phase angle exceeding the phase angle associated with the upper limit, the signal processor 14 looks for another shaft sync pulse. When the sensor 12 produces another shaft sync pulse, the digital signal processor 14 determines a new set of A, B and C coefficients and new upper and lower limits in the manner previously described. Thereafter, rather than finding a velocity trigger lying within the new limits, the signal processor bypasses this step and begins resampling data, starting at the lower end of the prior limit. Resampling continues in the manner described above until the prior data block is full, i.e., the remaining ones of the previously unfilled data sample set has been generated. At this point, the incremented phase angle that controls data sampling is at the point where data sampling began in the prior cycle of operation. When this occurs, depending upon whether the shaft is accelerating or decelerating, the prior velocity trigger signal is tested to determine if it is below the new upper limit or above the new lower limit. If the test is positive, a velocity trigger falling between the new limits is determined and the process repeated.

When resampling ends due to a data block being full, depending upon whether the shaft is accelerating or decelerating, the existing velocity trigger is likewise tested to determine if it lies below the current upper limit or above the current lower limit. Since, in this instance, the limits have not changed, the test is negative, whereby the digital signal processor looks for a new sync pulse before repeating the foregoing process.

Figure 4A:
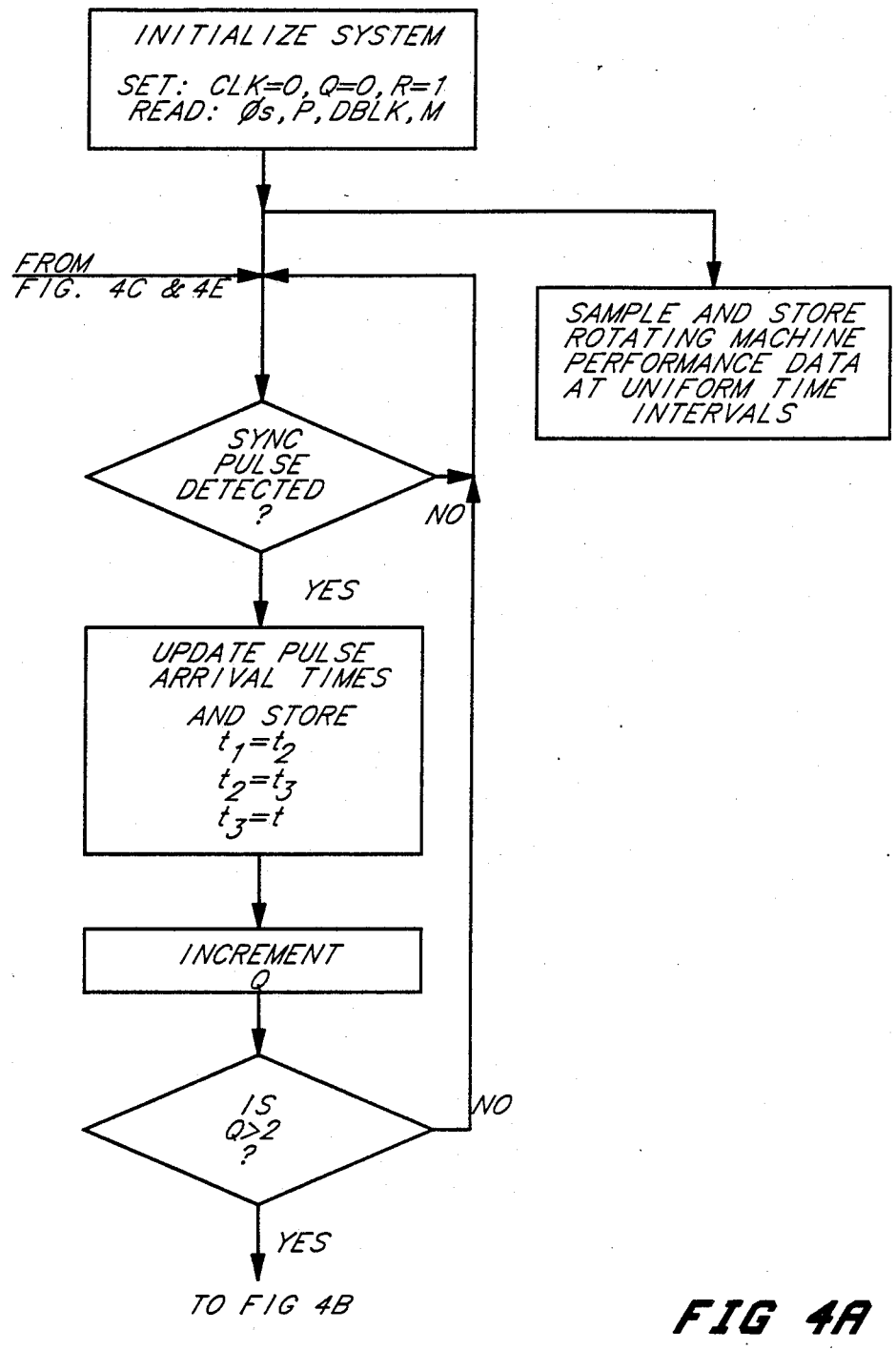
FIGS. 4A, 4B, 4C, 4D and 4E form a detailed flow diagram of a tracking and resampling method suitable for forming the system flow diagram depicted in FIG. 3.

FIGS. 4A–E are a series of flow diagrams that illustrate in detail a program suitable for use by the digital signal processor 14 to carry out the method of the invention functionally illustrated in FIG. 3 and described above. As shown in FIG. 4A, the first step performed by the signal processor 14 is to initialize the system by zeroing the following: a sync pulse counter designated Q; and, a pulse arrival time clock, designated CLK. A velocity trigger counter, designated R, is set equal to one. Additionally, as part of the initialization process, the signal processor 14 reads and stores data inputted by the operator via a suitable control and display unit. This data includes: the phase angle between the sync pulses produced by the sensor 12, $\phi_s$; the number of pulses per revolution of the shaft, P; the size of a data block that determines the number of resampling data points, DBLK; and the number of shaft revolutions to be in the data record, M.

After initialization, as depicted in FIG. 4A, the signal processor 14 samples and stores the outputs of the analog anti-aliasing filters 15 at uniform intervals controlled by the incrementing of CLK. Simultaneously, the signal processor determines the arrival times of pulses produced by the sensor 12. The arrival times are stored in a three-number table that is incremented each time a new pulse occurs, i.e., the arrival time, $t_2$, of the second pulse becomes the arrival time, $t_1$, of the first pulse; the arrival time, $t_3$, of the third pulse becomes the arrival time, $t_2$, of the second pulse; and, the arrival time, t, of the new pulse becomes the arrival time, $t_3$, of the third pulse. After each pulse is received and stored, the Q counter is incremented. Then the Q counter is tested to determine if its incremented value is greater than two (i.e., Q>2). When this test is passed, the program cycles to the portion illustrated in FIG. 4B.

Figure 4B:
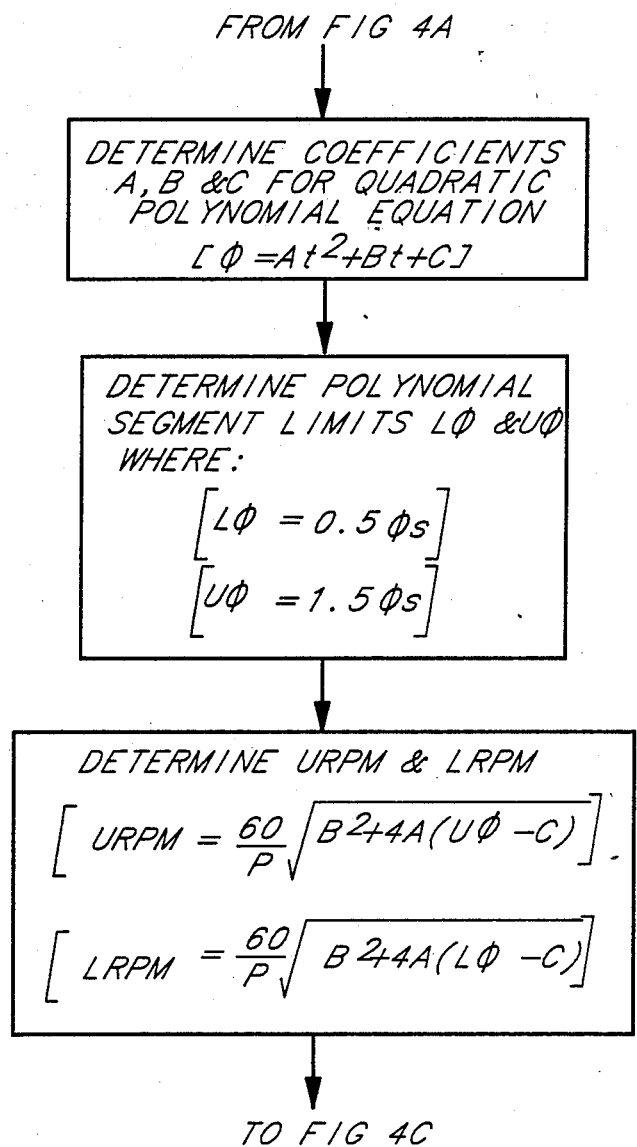

The first step of the portion of the program illustrated in FIG. 4B is to determine the value of the coefficients A, B and C of Equation (1) using $t_1$, $t_2$ and $t_3$ and their associated shaft phase angles $\phi_1$, $\phi_2$ and $\phi_3$. More specifically, in order to determine the value of the coefficients of a quadratic polynomial equation, such as Equation (1), the value of the variables required to create the three equations must be available. In this case, the values of the necessary data is provided by the arrival times, t, of the pulses produced by the sensor 12, which occur at known shaft phase angles $\phi$. If, for example, a pulse is produced for each revolution of the shaft, $\phi_0$ would equal 0°, $\phi_1$ would equal 360°, $\phi_2$ would equal 720°, $\phi_3$ would equal 1080°, $\phi_4$ would equal 1440°, etc. The simultaneous solution of the three equations using $t_1$, $t_2$, and $t_3$ and their associated phase angles results in the values of A, B and C being determined. Substitution of these values in Equation (1) allows Equation (1) to be used to determine the phase angle, $\phi$, associated with any time, t, lying between $t_1$ and $t_3$.

The next step of the portion of the program illustrated in FIG. 4B is to determine the limits of a segment of the curve defined by Equation (1), using the just determined values of A, B and C, within which resampling is to take place. While any portion of the curve, including the entire curve can fall within the limits, preferably, the limits encompass the center half of the curve, centered about the phase angle associated with $t_2$. Mathematically these limits are definable by the following equations:

$$L\phi = 0.5\phi_s \qquad (2)$$

$$U\phi = 1.5\phi_s \qquad (3)$$

where $\phi_s$ is the phase angle between sync pulses and $L\phi$ is the phase angle limit lying between the phase angles associated with $t_1$ and $t_2$ and $U\phi$ is the phase angle limit lying between the phase angles associated with $t_2$ and $t_3$. For descriptive purposes, $L\phi$ is herein referred to as the lower limit phase angle and $U\phi$ is herein referred to as the upper limit phase angle. Obviously, $U\phi$ and $L\phi$ are relative phase angles, whereas $\phi_0$, $\phi_1$, $\phi_2$, $\phi_3$, and $\phi_4$, etc. are absolute phase angles that continuously increase from a known point, such as 0°.

The next step of the program illustrated in FIG. 4B is to convert $L\phi$ and $U\phi$ from phase angle form into related velocity form, in terms of RPM. In order to better understand how this is accomplished, a description of the derivation of the conversion formula is set forth next.

As noted above, the embodiment of the invention described herein, which is based on a quadratic polynomial, assumes that shaft velocity varies linearly with respect to time. This assumption allows the sync pulse frequency to be derived by taking the first derivative of Equation (1). The resulting equation is:

$$\frac{d\phi}{dt} = 2At + B \qquad (4)$$

where A and B are the previously derived polynomial coefficients.

For P synchronous pulses per revolution and $\phi$ measured in shaft revolutions, the sync pulse frequency can be expressed in revolutions per minute (RPM) by multipling Equation (4) by the factor 60/P, resulting in the following equation:

$$RPM = \frac{60}{P} \cdot (2At + B) \qquad (5)$$

Solving Equation (5) for t and substituting the result for t in Equation (1) produces the following equation:

$$RPM = \frac{60}{P} \cdot \sqrt{B^2 + 4A(\phi - C)} \qquad (6)$$

As will be readily observed, Equation (6) establishes a relationship between shaft velocity (in terms of RPM) and shaft phase angle, $\phi$, that is independent of time. The signal processor 14 uses Equation (6) to establish trigger velocity limits for $L\phi$ and $U\phi$ by substituting $L\phi$ and $U\phi$ for $\phi$ and solving the equation, as shown in the last step of FIG. 4B.

Figure 4C:
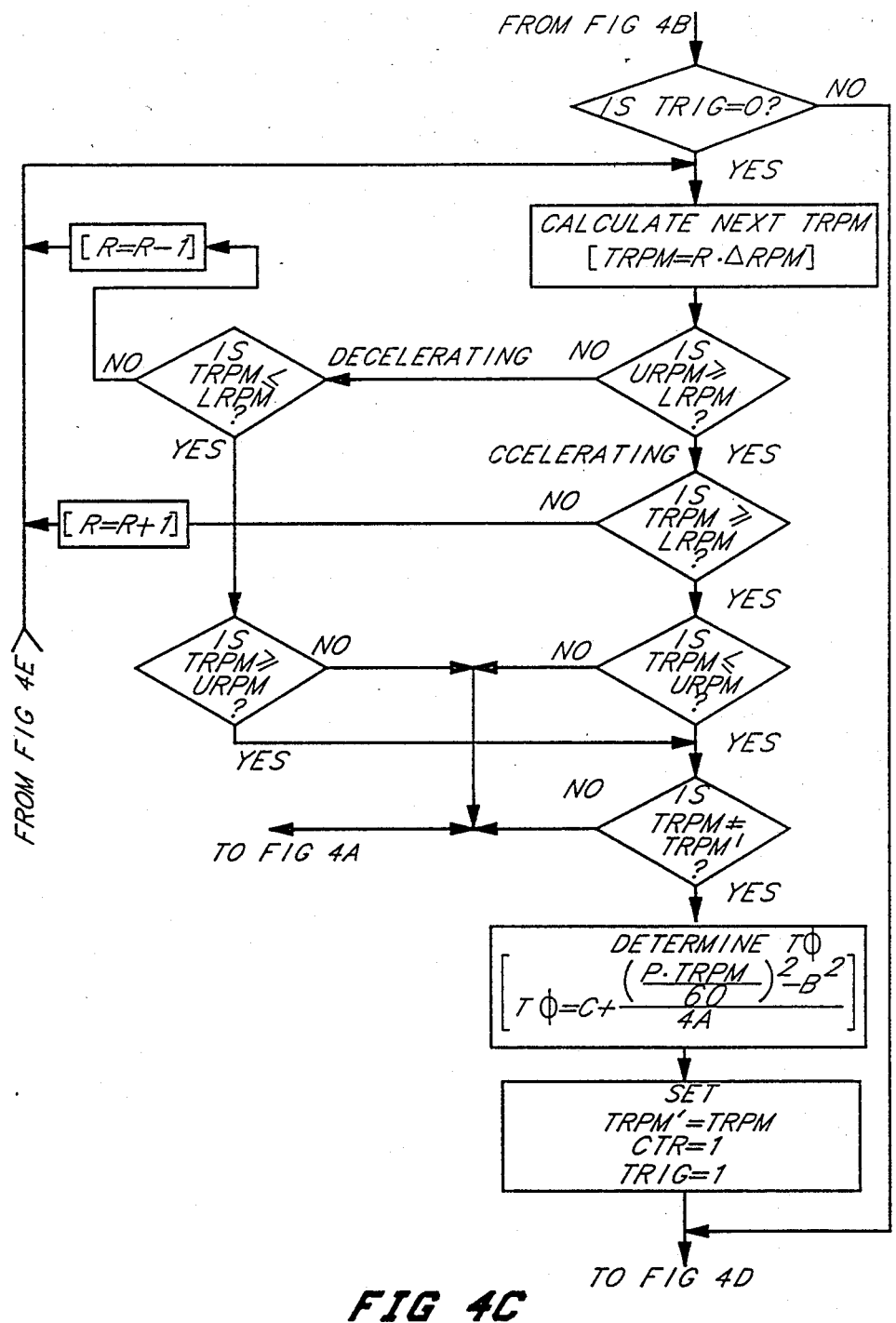

The next series of steps performed by the signal processor 14 and illustrated in FIG. 4C, is the determination of a velocity trigger, designated TRPM, that falls within the upper and lower velocity limits, URPM and LRPM. The first step in this sequence is to test a trigger flag, designated TRIG, which is set in the manner described below when a valid TRPM value is found and cleared when a full block of data (DBLK) has been developed. When TRIG is set, i.e., equal to one, the signal processor 14 bypasses the portion of the program, illustrated in FIG. 4C, and proceeds to the steps illustrated in FIG. 4D.

As shown in FIG. 4C, when TRIG is clear, a velocity trigger, TRPM, value is calculated. The calculation involves changing the current TRPM value by a velocity increment, $\Delta$RPM, which is determined by the user (i.e., a given value).

As illustrated in FIG. 4C, the next TRPM value is calculated by using the equation:

$$TRPM = R \cdot \Delta RPM \qquad (7)$$

where R is the state of the R counter that was set to one during the initialization part of the program. As described below, the state of the R counter is incremented or decremented respectively each time the program determines that the current velocity trigger, TRPM, does not lie between the upper and lower velocity limits, URPM, and LRPM. The direction of change is always toward moving the calculated velocity trigger toward the region between the upper and lower velocity limits. Hence, TRPM can increase or decrease. How the change is created is determined by the following described steps of the portion of the program illustrated in FIG. 4C.

After the Equation (7) calculation takes place, the new TRPM value is evaluated by a series of tests to determine if it lies between the URPM and LRPM. The first step in the series of tests is to determine if the shaft 11 of the rotating machine 10 is accelerating or decelerating. This is accomplished by determining if URPM is greater than or equal to LRPM. If URPM is greater than or equal to LRPM, the velocity of shaft 11 is increasing and therefore, by definition, accelerating. Contrariwise, if URPM is not greater than or equal to LRPM, the shaft 11 is decreasing in speed, or decelerating. If the shaft 11 is accelerating, the signal processor 14 next determines if the new TRPM value is greater than or equal to LRPM. If the new TRPM value is not greater than or equal to LRPM, TRPM is below LRPM and, thus, not between LRPM and URPM. In this instance, R is incremented and a new TRPM value calculated. If the shaft is decelerating, the signal processor determines if the new TRPM value is less than or equal to LRPM. If the new TRPM value is not less than or equal to LRPM, TRPM is above LRPM and, thus, not between LRPM and URPM. In this instance, R is decremented and a new TRPM value is calculated.

If the shaft is accelerating and TRPM is equal to or greater than LRPM, TRPM is tested to determine if TRPM is less than or equal to URPM. If TRPM is not less than or equal to URPM, TRPM does not lie between LRPM and URPM. In this instance, the program cycles to the point where it looks for the next sync pulse (FIG. 4A). If the shaft is decelerating and TRPM is equal to or less than LRPM, TRPM is tested to determine if TRPM is greater than or equal to URPM. If TRPM is not greater than or equal to URPM, TRPM does not lie between LRPM and URPM. In this instance, the program again cycles to the point where it looks for the next sync pulse.

Regardless of whether the shaft is accelerating or decelerating, if TRPM is found to lie between LRPM and URPM, TRPM is tested to determine if it equals the immediately proceeding TRPM, which is designated TRPM' in FIG. 4C. If TRPM equals TRPM', the program cycles to the point where it looks for the next sync pulse.

If TRPM does not equal TRPM' and if all the other above conditions are satisfied, as illustrated near the lower right corner of FIG. 4C, the signal processor 14 calculates the trigger phase angle, T$\phi$, associated with TRPM. This calculation is performed by rearranging Equation (6) to solve for phase angle, $\phi$, and substituting TRPM for RPM. When this is done the following equation is developed:

$$T\phi = C + \frac{\left(\frac{P \cdot TRPM}{60}\right)^2 - B^2}{4A} \tag{8}$$

Solving this equation using the previously determined values of A, B, C and TRPM and the given value of P determines the trigger phase angle T$\phi$ associated with TRPM.

After the trigger phase angle, T$\phi$, has been calculated, the current velocity trigger, TRPM, is set equal to TRPM', the count value, CTR, stored in a resample counter, is set equal to one, and the trigger flag, TRIG, is set.

Figure 4D:
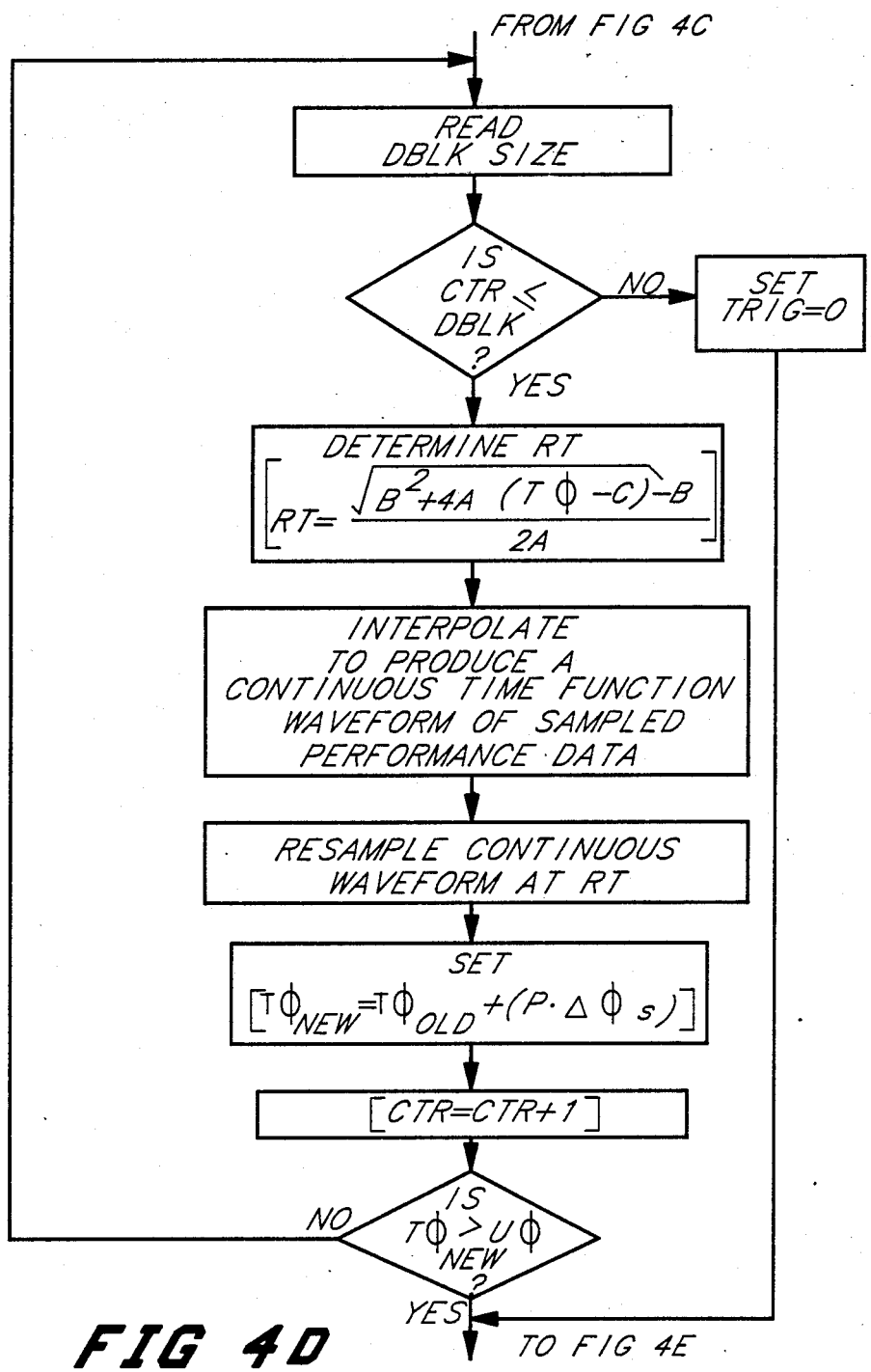

FIG. 4D illustrates the next sequence of steps performed by the signal processor 14, which are the interpolation and resampling steps. The first step is for the signal processor 14 to read the number of points to be resampled, i.e., the size of the data block, DBLK, which was inputted to the signal processor 14 by the operator during the initialization step. After the signal processor 14 reads DBLK, DBLK is compared to the count value, CTR, stored in the resample counter. If CTR is less than or equal to DBLK, the signal processor 14 proceeds with the resampling steps illustrated in FIG. 4D and described below. If CTR is not less than or equal to DBLK, the resampling process is complete. As a result, the trigger flag, TRIG, is cleared, i.e., set equal to 0, and the program bypasses the resampling steps illustrated in FIG. 4D and described next.

If CTR is less than or equal to DBLK, a resampling time, designated RT, associated with the current trigger phase angle, T$\phi$, is calculated using an equation obtained by rearranging Equation (1) to solve for t. As shown in FIG. 4D, this equation has the following form:

$$RT = \frac{\sqrt{B^2 + 4A(T\phi - C)} - B}{2A} \tag{9}$$

The next step in the sequence illustrated in FIG. 4D is to interpolate the sampled rotating machine performance data so as to produce a continuous time function waveform of the form illustrated in FIG. 5D. More specifically, FIG. 5A is a waveform representing data of the type produced at the output of one of the analog anti-aliasing filters 15 (FIG. 2). FIG. 5B represents the uniform time intervals at which data samples of the FIG. 5A waveform are taken; and, FIG. 5C shows the data samples. FIG. 5D shows the result of interpolating the digitized waveform illustrated in FIG. 5C. The result is a continuous waveform that closely follows the actual rotating machine performance data waveform, as can be readily seen by comparing FIGS. 5A and 5D.

Since there are innumerable ways of interpolating digitized waveforms that are well known to those skilled in the interpolating art, a specified interpolation process is not described here. Obviously, among other things the choice of a specific interpolation process to be used in an actual embodiment of the invention will depend upon economics and the level of interpolation sophistication necessary.

After the sampled performance data has been interpolated to produce a continuous time function waveform of the type illustrated in FIG. 5D, the continuous time function waveform is resampled by the signal processor 14 at time RT, and the result of the resampling is stored. Thereafter, as illustrated in FIG. 4D, the phase angle, T$\phi$, corresponding to TRPM is incremented by P·$\Delta\phi_s$, where, as noted above, P is equal to the number of pulses produced per shaft revolution and $\Delta\phi_s$ is determined by dividing the number of shaft revolutions in the data recorded, M, by the data block size, DBLK. That is, the new T$\phi$ value is determined in accordance with the following equation:

$$T\phi_{new} = T\phi_{old} + (P \cdot \Delta\phi_s) \tag{10}$$

Thereafter, the count value, CTR, stored in the resample counter is incremented.

After the output counter, CTR, is incremented, the program decides whether the incremented phase angle, T$\phi_{new}$, lies within the current resampling range. More specifically, T$\phi_{new}$ is tested to determine if $T_{new}$ is less than U$\phi$, which, as will be recalled, corresponds to the upper velocity limit, URPM. If T$\phi_{new}$ is greater than U$\phi$, T$\phi_{new}$ is not within the current resampling range. As a result, the program exits the resampling process shown in FIG. 4D and cycles to the seek new velocity trigger sequence of steps illustrated in FIG. 4E and described below.

Figure 4E:
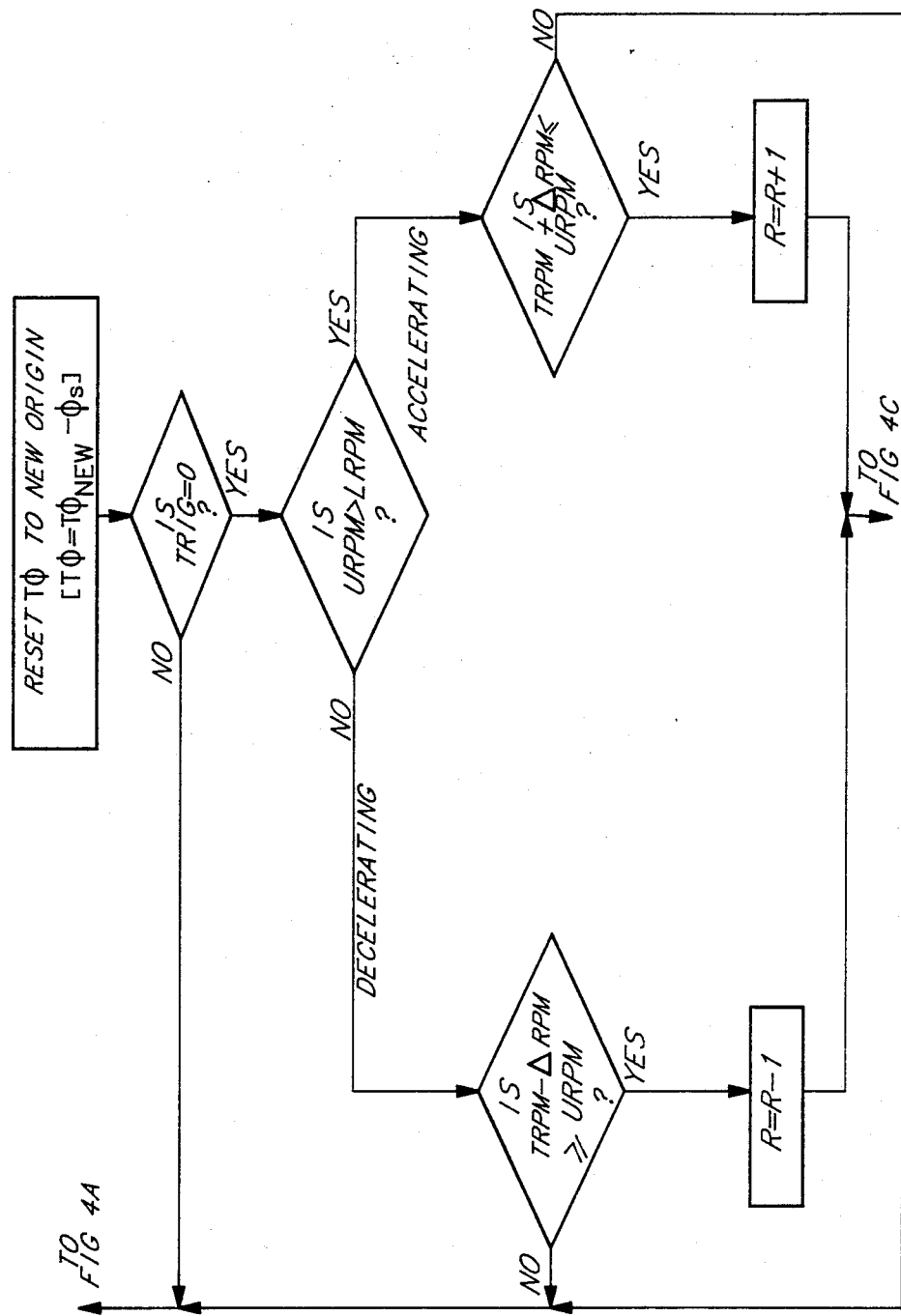

If T$\phi_{new}$ is not greater than U$\phi$, then the signal processor 14 cycles back through the resampling steps illustrated in FIG. 4D. More specifically, the DBLK is read and the incremented CTR value is tested to determine if it is less than or equal to DBLK. If the incremented CTR value is less than or equal to DBLK a new RT value based on $T\phi_{new}$ is obtained using Equation (9). Thereafter a new data sample at the new RT time is developed using the procedure outlined above and the new data sample is stored. Unless CTR reaches a value greater than DBLK first, this series of steps is repeated until the new trigger phase angle, $T\phi_{new}$ exceeds $U\phi$, at which time the signal processor 14 exits the resampling portion of the program and enters the seek new velocity trigger portion of the program, which is illustrated in FIG. 4E and described next.

The first step of the seek new velocity trigger portion of the program is to reset $T\phi_{new}$, i.e., to reset the resample controlling phase angle existing at the time the resampling portion of the program ended. $T\phi_{new}$ is reset by subtracting a phase angle equal to the phase angle between shaft sync pulses, namely $\phi_s$. Thus, if $T\phi_{new}$ exceeded $U\phi$ when the resampling portion of the program ended, the reset value ($T\phi$) exceeds $L\phi$ by the same amount that $T\phi_{new}$ exceeded $U\phi$, which amount is no more than the sample incrementing phase angle, namely $\Delta\phi_s$.

After $T\phi$ has been reset, TRIG is tested to determine if it is equal to zero. If TRIG is not equal to zero, i.e., TRIG is set to one, the data block (DBLK) associated with the resampling segment located between the current values of $L\phi$ and $U\phi$ is incomplete. In this instance the program cycles to the point (FIG. 4A) where the signal processor 14 looks for the next sync pulse. The program remains at this location until the next sync pulse occurs. After the next sync pulse occurs, the stored values of $t_1$, $t_2$ and $t_3$ are updated in the manner described above. Then, a new set of A, B and C coefficients and new upper and lower limits (URPM and LRPM) are calculated also in the manner described above. However, since TRIG is still set to one, the find velocity trigger and convert to phase angle steps (FIG. 4C) are bypassed. The program cycles directly to the interpolate sampled data and resample interpolated sample data steps (FIG. 4D). Thus, data resampling begins between the previously calculated $L\phi$ and $U\phi$ limits, starting near the $L\phi$ limit. Resampling continues until the counter value, CTR, becomes greater than DBLK. When this occurs TRIG is set to zero. If not identical, the $T\phi$ value ($L\phi$ plus $\Delta\phi_s$ increments) is close to the $T\phi$ value associated with the still existing TRPM. As a result, data samples covering the entire range between the preceding values of $L\phi$ and $U\phi$ are generated and stored.

After TRIG is set to zero in the manner just described, the program again cycles to the seek new velocity trigger steps (FIG. 4E), whereupon $T\phi_{new}$ is reset in the manner previously described. (As will be better understood from the following discussion, this resetting has no effect in this instance.) After $T\phi_{new}$ is reset, TRIG is tested. Since TRIG is now one, the program does not cycle to the point where the signal processor 14 looks for the next sync pulse. Rather, the new URPM and LRPM values are compared to determine if the shaft 11 is accelerating or decelerating. If URPM is greater than LRPM the shaft 11 is accelerating, and if URPM is not greater than LRPM the shaft 11 is decelerating.

If the shaft 11 is accelerating, a test is made to determine if the current value of TRPM (i.e., the TRPM value associated with the previous $L\phi$ and $U\phi$ limits) plus $\Delta$RPM is less than or equal to URPM (i.e., the URPM value related to the current $U\phi$ limit). If TRPM+$\Delta$RPM is less than or equal to URPM, TRPM is below the current URPM value. In this instance, R is incremented and the program cycles to the point in the find velocity trigger and convert to phase angle portion of the program (FIG. 4C) where TRPM is calculated and then tested to determine if it lies between LRPM and URPM. Thereafter, as discussed above, TRPM is incremented until it lies between LRPM and URPM, converted to $T\phi$ and $T\phi$ is used to initiate the resampling process (FIG. 4D).

If TRPM+$\Delta$RPM is not less than or equal to URPM, TRPM+$\Delta$RPM lies above URPM. In this instance the digital signal processor 14 cycles to the point (FIG. 4A) where it looks for the next sync pulse.

If the shaft 11 is decelerating a generally similar procedure is followed. More specifically, a test is made to determine if the current value of TRPM (i.e., the TRPM value associated with the previous $L\phi$ and $U\phi$ limits) minus $\Delta$RPM is greater than or equal to URPM (i.e., the URPM value related to the current $U\phi$ limit). If TRPM−$\Delta$RPM is greater than or equal to URPM, TRPM is above the current URPM value. In this instance, R is decremented and the program cycles to the point in the find velocity trigger and convert to phase angle portion of the program (FIG. 4C) where TRPM is calculated and then tested to determine if it lies between LRPM and URPM. Thereafter, as discussed above, TRPM is decremented until it lies between LRPM and URPM, converted to $T\phi$ and $T\phi$ is used to initiate the resampling process (FIG. 4D).

If TRPM is not greater than or equal to URPM, TRPM−$\Delta$RPM lies below URPM. In this instance the digital signal processor 14 cycles to the point (FIG. 4A) where it looks for the next sync pulse.

As will be appreciated from the foregoing discussion of the seek new velocity trigger substeps illustrated in FIG. 4E, in essence the program will initiate resampling between a new set of $L\phi$ and $U\phi$ limits after it finishes an incomplete sampling between prior $L\phi$ and $U\phi$ limits. When resampling between current limits is complete, the digital signal processor idles until the next sync pulse is detected.

In summary, the invention provides a tracking and resampling method and apparatus for monitoring the performance of machines based on phase angle. FIGS. 5 and 6 are a series of waveforms that depict the operation of the embodiment of the invention described above. FIG. 5A illustrates the performance data of a machine 10 having a rotating shaft 11 with varying velocity. In accordance with the invention, this data is sampled at uniform times (FIG. 5B) to form a digitized waveform (FIG. 5C). The digitized waveform is interpolated to form a continuous time function waveform (FIG. 5D). For a shaft 11 having variable velocity, the uniform time increments in FIG. 5B correlate to nonuniform phase angle increments (FIG. 5E). The converse relationship is also true as illustrated in FIGS. 6A through D. More specifically, in the phase domain, as opposed to time domain, uniform phase angle increments (FIG. 6A) produce a digitized waveform (FIG. 6B) which can be interpolated to form a continuous time function waveform of the performance data of a machine 10 having a rotating shaft 11 with varying velocity (FIG. 6C). The uniform phase angle increments correspond to nonuniform time increments (FIG. 6D).

It is to be understood from the foregoing description, that the resampling times, RT, of a particular polynomial segment, are not real time values. In fact, the RT values are relative to $t_1$ of that particular polynomial segment. For display purposes, the relative RT values must be added to the $t_1$ value associated with the polynomial segment in which the RT values reside. For example, to display a resampled waveform in real time, the relative RT values calculated in the above method of the invention are added to the $t_1$ value of the associated polynomial segment. This $t_1$ value is made available by the real time clock (CLK) which was initialized (i.e., set to zero) at the beginning of the method set forth in this embodiment. When these real time values for RT are determined, the next set of RT values, corresponding to a subsequent polynomial segment, are added to the $t_1$ value associated with the subsequent polynomial segment. This process is repeated until the desired real time curve is achieved.

As will be readily appreciated from the foregoing description, the invention provides a new and improved tracking and resampling method for monitoring the performance of rotating machines. While a preferred embodiment of the invention has been illustrated and described, it will be appreciated that various changes can be made therein (i.e., in the hardware and software) without departing from the spirit and scope of the invention. More specifically, while the polynomial equation, representing the characteristics of the rotating machine 10 has been presented as a quadratic polynomial in the preferred embodiment of the invention (Equation 1), it is recognized that other forms of polynomial equations may be used to represent the rotating machine 10 under test. The choice of a particular order of polynomial equation is premised on the economics and degree of accuracy of the specific situation and, therefore, it is further understood that the use of a polynomial equation, other than the quadratic polynomial equation disclosed, falls within the spirit and scope of the invention. Hence, the invention can be practiced otherwise than as specifically described herein.

The embodiments of the invention in which an exclusive property or privilege is claimed are defined as follows:

1. Apparatus for producing data related to the performance of a rotating shaft machine (10), having a rotating shaft (11), on a uniform phase angle basis, said apparatus comprising:
   (a) at least one measuring device (13) for measuring a selected parameter of a rotating shaft machine (10) and producing a data signal;
   (b) a sensor (12) for sensing rotation of the shaft (11) of said rotating shaft machine (10) and producing sync pulses when said shaft (11) is at known phase angle positions; and,
   (c) a signal processor (14) connected to said at least one measuring device (13) for receiving the data signal of said at least one measuring device (13) and to said sensor (12) for receiving the sync pulses produced by said sensor (12), said signal processor (14) programmed to:
   (1) sample, on a known time basis, the data signal to produce rotating shaft machine performance data;
   (2) determine the time of arrival of said sync pulses;
   (3) utilize said sync pulse time of arrival and shaft phase angle relationship to determine the values of the coefficients of a polynomial equation that relates the time to shaft phase angle;
   (4) determine from the polynomial equation resample times which correspond to when the shaft reached the uniform phase angles; and,
   (5) resample said rotating machine performance data at the resample times to produce uniform phase angle based data samples.

2. The apparatus claimed in claim 1 wherein the time intervals between samples made by the signal processor on a know time basis are constant.

3. The apparatus claimed in claim 2 further comprises an anti-alias filter means connected between the measuring device and the signal processor for filtering the data signal generated by the measuring device, said filter means having a constant cutoff frequency.

4. The apparatus claimed in claim 3 wherein the signal processor resamples the rotating machine performance data by:
   selecting a first set of samples from the rotating machine performance data each having its sample time before the resample time;
   selecting a second set of samples from the rotating machine performance data each having its sample time after the resample time; and,
   generating each resample of the resampled rotating machine performance data by interpolating between the first and second set of samples.

5. The apparatus claimed in claim 2, wherein said polynomial equation that relates the time to shaft phase angle is a quadratic polynomial equation of the form:

$$\phi = At^2 + Bt + C$$

where $t$ is time, $\phi$ is the shaft phase angle, and A, B and C are said coefficients of said quadratic polynomial equation.

6. The apparatus claimed in claim 5, wherein said signal processor (14) determines the values of A, B and C by substituting the sync pulse time of arrival and the related shaft phase angle into said quadratic equation for three sequential sync pulses and simultaneously solving the resulting three equations.

7. The apparatus claimed in claim 6, wherein said resample times lie between the arrival times of the first and last of the three sequential sync pulses used to determine the values of A, B and C.

8. The apparatus claimed in claim 7 wherein the step of determining resample times comprises the step of substituting the uniform phase angle into the polynomial equation and solving the polynomial equation for the resample times.

9. The apparatus claimed in claim 8, wherein said signal processor (14) is programmed to repetitively repeat the preceding steps.

10. A method of producing phase sampled performance data at predetermined phase angles of a rotating shaft machine, having a shaft with a continuously varying phase angle, said method comprising the steps of:
   measuring a selected parameter of a rotating shaft machine to produce a data signal;
   sampling, on a known time basis, the data signal to generate time sampled performance data;
   recording on a known time basis, the phase angle of the shaft of the rotating shaft machine, the phase angle being determined from data produced by a sensor;
   determining from the recorded phase angle of the shaft resample times which correspond to when the shaft reached the predetermined phase angles; and resampling the time sampled performance data at the resample times to generate phase sampled performance data.

11. The method claimed in claim 10 wherein the time intervals between samples made by sampling the data signal on a know time basis are constant.

12. The method claimed in claim 11, wherein the step of measuring a selected parameter of a rotating shaft machine further comprises the steps of:
sensing a selected parameter of a rotating machine to produce the data signal; and
anti-alias filtering the data signal with a filter having a constant cutoff frequency.

13. The method claimed in claim 12, wherein the step of resampling said time sampled performance data comprises the steps of:
selecting a first set of samples from the rotating machine performance data each having its sample time before the resample time;
selecting a second set of samples from the rotating machine performance data each having its sample time after the resample time; and,
generating each resample of the resampled rotating machine performance data by interpolating between the first and second set of samples.

14. The method claimed in claim 11, wherein the step of recording, on a known time basis, the phase angle of the shaft further includes the steps of:
receiving sync pulses produced by a sensor (12) coupled to the shaft (11) of said rotating shaft machine (10) such that said sync pulses have a known relationship to the phase angle of the shaft (11) of said rotating shaft machine (10);
determining the time of arrival of said sync pulses; and,
utilizing said sync pulse time of arrival and shaft pulse angle relationship to determine values for coefficients of a polynomial equation that relates time to shaft phase angle.

15. The method claimed in claim 14, wherein said polynomial equation that relates time to shaft phase angle is a quadratic polynomial equation of the form:

$$\phi = At^2 + Bt + C$$

where t is time, $\phi$ is the shaft phase angle, and A, B and C are said coefficients of said quadratic polynomial equation.

16. The method claimed in claim 15, wherein the values of A, B and C are determined by substituting the sync pulse time of arrival and the related shaft phase angle into said quadratic equation for three sequential sync pulses and simultaneously solving the resulting three equations.

17. The method claimed in claim 16, wherein said resample times lie between the arrival times of the first and last of the three sequential sync pulses used to determine the values of A, B and C.

18. The method claimed in claim 17, wherein the step of determining the resample time comprising substituting the predetermined phase angle into the polynomial equation and solving the polynomial equation for the resample time.

19. The method claimed in claim 18, including the step of repetitively repeating the preceding steps.

20. Apparatus for producing data related to the performance of a rotating shaft machine, having a rotating shaft, beginning at an predetermined initial velocity and repeating at a predetermined incremental velocity intervals from a starting time, relative to the occurrence of the predetermined initial velocity, to an ending time, said apparatus comprising:
(a) measuring means for measuring a selected parameter of a rotating shaft machine and producing a data signal;
(b) sensor means for sensing rotation of the shaft of said rotating shaft machine and producing sync pulses when said shaft is at known phase angle positions; and,
(c) a signal processor connected to the measuring means for receiving the data signal and to the sensor means for receiving the sync pulses, said signal processor programmed to:
(1) sample, at a predetermined fixed frequency, the data signal;
(2) determine the time of arrival of said sync pulses;
(3) utilize said sync pulse time of arrival and shaft phase angle relationship to determine the values of the coefficients of a polynomial equation that relates time to shaft phase angle;
(4) determine the velocity of the shaft from the polynomial equation;
(5) repeat the steps (1) through (5) until the predetermined initial velocity is reached;
(6) beginning at the starting time and continuing to the ending time determine from the polynomial equation resample times corresponding to each incremental velocity interval relative to the predetermined initial velocity; and,
(7) resample said rotating machine performance data at the resample times to produce incremental velocity based data samples.

21. The apparatus claimed in claim 20 further comprising an anti-alias filter means connected between the measuring means and the signal processor for filtering the data signal, said filter means having a constant cutoff frequency.

* * * * *